(12) United States Patent
Fujimaki (10) Patent No.: US 7,202,967 B2
(45) Date of Patent: Apr. 10, 2007

(54) PRINTER, CONTROL PROGRAM LOADING METHOD, AND MEDIUM AND PAGE PRINTER RECORDING LOAD CONTROL PROGRAMS

(75) Inventor: Atsushi Fujimaki, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 933 days.

(21) Appl. No.: 10/372,664

(22) Filed: Feb. 25, 2003

(65) Prior Publication Data

US 2003/0174362 A1 Sep. 18, 2003

(30) Foreign Application Priority Data

Feb. 25, 2002 (JP) ............... 2002-047811

(51) Int. Cl.
G06K 15/00 (2006.01)
G06K 1/00 (2006.01)
G06F 15/00 (2006.01)

(52) U.S. Cl. .................... 358/1.16; 358/1.17

(58) Field of Classification Search ........... 358/1.1, 358/1.16, 1.17, 1.15, 1.9, 1.6, 1.2, 1.14, 1.18, 358/523, 524, 437

See application file for complete search history.

(56) References Cited

U.S. PATENT DOCUMENTS 6,992,783 B1 * 1/2006 Sumiuchi .............. 358/1.15

2002/0184495 A1 * 12/2002 Torii et al.

FOREIGN PATENT DOCUMENTS

| JP | 5-327955 A | 12/1993 |
|---|---|---|
| JP | 2000-315141 A | 11/2000 |
| JP | 2001-322319 A | 11/2001 |

* cited by examiner

*Primary Examiner*—Douglas Q. Tran
(74) *Attorney, Agent, or Firm*—Sughrue Mion, PLLC (57) ABSTRACT

When a control program is executed, it needs to be first decompressed and loaded into RAM. It has been impossible to immediately execute the control program when it is requested, causing a hindrance to processing speed acceleration. A printing apparatus is mounted with volatile memory that provides a main storage area. The printing apparatus specifies a second control program to be preferentially decompressed on the basis of a storage capacity of the volatile memory. The printing apparatus decompresses the specified second control program before execution and loads it into the volatile memory. Accordingly, there is no need for decompression and the like during execution of the second control program. It is possible to increase processing speeds of the first and second control programs.

11 Claims, 10 Drawing Sheets

Load rule data

| Capacity of mounted RAM (MB) | 64 | 32 | 16 | 8 |
|---|---|---|---|---|
| Module a | 1 | 1 | | 8 |
| Module b | 2 | | 1 | 1 |
| Module c | 3 | 2 | 2 | |
| Module d | 4 | 3 | | |
| Module e | | 4 | | |
| ---------- | | | | |
| Module n | | | | 2 |

Load rule data

| Capacity of mounted RAM (MB) | 64 | 32 | 16 | 8 | Number of loads |
|---|---|---|---|---|---|
| Module a | 1 | 1 |   |   | 2 |
| Module b | 2 |   | 1 | 1 | 20 |
| Module c | 3 | 2 | 2 |   | 39 |
| Module d | 4 | 3 |   |   | 21 |
| Module e |   | 4 |   |   | 15 |
| ------------- |   |   |   |   |   |
| Module n |   |   |   | 2 | 8 |

FIG. 7

| Load rule data | | | | | | | |
|---|---|---|---|---|---|---|---|
| Capacity of mounted RAM (MB) | 64 | 32 | 16 | 8 | | | |
| Module a | ○ | ○ | × | × | | | |
| Module b | ○ | × | ○ | ○ | | | |
| Module c | ○ | ○ | ○ | × | | | |
| Module d | ○ | × | × | × | | | |
| Module e | × | × | × | × | | | |
| ------------ | ------------ | ------------ | ------------ | ------------ | | | |
| Module n | × | × | × | × | | | |

FIG. 8

Load rule data

| Capacity of RAM (MB) | Mounted 64 | | | | Unused 32 | |
|---|---|---|---|---|---|---|
| | 32~64 | 16~32 | 8~16 | 0~8 | | ........ |
| Module a | 1 | 1 | | | | |
| Module b | 2 | | 1 | 1 | | |
| Module c | 3 | 2 | 2 | | | |
| Module d | 4 | 3 | | | | |
| Module e | | 4 | | | | |
| ------------ | | | | | | |
| Module n | | | | 2 | | |

PRINTER, CONTROL PROGRAM LOADING METHOD, AND MEDIUM AND PAGE PRINTER RECORDING LOAD CONTROL PROGRAMS

BACKGROUND OF THE INVENTION

1. Field of the Invention

The present invention relates to a printing apparatus, control program loading method, and a page printer recording load control programs. More specifically, the present invention relates to a printing apparatus to load various control programs into volatile memory for processing and printing, a control program loading method, and a medium and a page printer recording load control programs.

2. Description of Related Art

Conventionally, there is widely known a page printer or the like provided with a program execution environment comprising ROM, RAM, CPU, etc. as such type of printing apparatus. In order to efficiently use necessary and sufficient memory resources mounted, the page printer divides a control program into a main program and another module and compresses and stores them in the ROM. During operation, the printer loads the main program into the RAM and executes it. When the main program requests another module, the printer decompresses the module and loads it into the RAM for execution.

At the time of executing control programs, the conventional printing apparatus first needs to decompress each control program and load it into the RAM. It has been impossible to immediately execute the control program when it is requested, causing a hindrance to processing speed acceleration.

SUMMARY OF THE INVENTION

The present invention has been made in consideration of the foregoing. It is therefore an object of the present invention to provide a printing apparatus, a control program loading method, and a medium and a page printer recording load control programs capable of accelerating control program processing based on a simple configuration.

In order to achieve the above-mentioned object, the present invention provides a printing apparatus having volatile memory to provide a main storage area and nonvolatile memory to store a first control program to be used constantly and a second control program to be used as needed, wherein both control programs are compressed. When the second control program becomes necessary in accordance with execution of the first control program, the printing apparatus dynamically decompresses the second control program stored in the nonvolatile memory into the volatile memory and executes the decompressed second control program. The printing apparatus comprises: a storage capacity acquisition unit to obtain a storage capacity of the volatile memory; a preferred decompression control program selection unit to specify the second control program to be preferentially decompressed in accordance with the obtained storage capacity; and a load control unit to decompress the specified second control program and load the same into the volatile memory during a specified period before execution of the specified second control program.

According to the present invention having the above-mentioned configuration, the printing apparatus can mount volatile memory that provides a main storage area. The nonvolatile memory stores a first control program to be used constantly and a second control program to be used as needed. Various processes in the printing apparatus are implemented by executing the first control program and the second control program as needed. The first and second control programs are executed while they are loaded in the specified volatile memory. Here, the second control program comprises a plurality of modules. The printing apparatus appropriately calls and executes the second control program during various processes.

In order to accelerate processing of the first and second control programs, the present invention comprises the storage capacity acquisition unit, the preferred decompression control program selection unit, and the load control unit. The storage capacity acquisition unit obtains a storage capacity of the volatile memory. That is to say, the storage capacity acquisition unit obtains a storage capacity of the volatile memory mounted on the printing apparatus. The storage capacity to be obtained from the volatile memory may be static or dynamic.

The preferred decompression control program selection unit specifies a second control program that is stored in the nonvolatile memory and should be decompressed preferentially. The second control program is specified on the basis of the storage capacity obtained by the storage capacity acquisition unit. The load control unit decompresses the specified second control program during a specified period before execution of that second control program and loads it into the volatile memory.

The load control unit according to the present invention decompresses the second control program before call to it and loads it into the volatile memory. When the second control program is called, it can start executing immediately without decompression and the like. In this sense, the load control unit preloads the second control program.

Preloading the second control program may decrease a work area for the first control program, adversely affecting execution of the first control program. According to the present invention, however, the preferred decompression control program selection unit obtains the volatile memory capacity and specifies a second control program to be decompressed preferentially in consideration for the obtained capacity. Since the present invention specifies the second control program to be decompressed preferentially so as not to adversely affect execution of the first control program, it is possible to preload the second control program so as not to adversely affect the first control program while loading the first control program into the volatile memory and executing it.

In order to load a compressed second control program into the volatile memory and make it executable, it is necessary to decompress the second control program and then load it into the volatile memory. The load operation requires decompression, reading from the nonvolatile memory, and writing to memory. Performing the decompression and the like at the time of calling the second control program increases a processing load on the first control program. According to the present invention, however, the second control program is decompressed and loaded during a specified period before program execution. Accordingly, processing loads such as decompression and program loading do not adversely affect processing of the first control program. The printing apparatus is free from a decrease in speeds for various processes.

As mentioned above, the present invention can preload the second control program without affecting the control program running on the printing apparatus. The present invention can provide a printing apparatus capable of executing the control program, a control program loading method, and a medium recording load control programs, and load control programs without decelerating various processes in the printing apparatus.

Here, the first and second control programs include various programs that perform control processes for the printing apparatus. The first control program calls the second control program to execute a specific process or control. That is to say, the second control program is a subprogram or the like that is executed as needed. The second control programs are moduled, compressed, and stored in the nonvolatile memory.

The volatile memory just needs to load the first and second control programs when executing them or work as a buffer for image data processing. This memory is volatile because there is no need for writing and deleting data as needed or reserving data while the printing apparatus is inactive. The volatile memory can be configured by RAM or the like.

The nonvolatile memory just needs to store the first and second control programs and can be configured by various types of memory. When no modification is made to the first and second control programs after the printing apparatus is manufactured, ROM and the like can be used for the nonvolatile memory. When it is expected to modify the first and second control programs, it is possible to use memory capable of writing and deleting data such as EEPROM and flash memory. In any case, it is preferable to use memory that does not delete data after removal of power supplied to the printing apparatus.

The preferred decompression control program selection unit just needs to specify a second control program to be decompressed preferentially according to the storage capacity of the volatile memory. Depending on the storage capacity, all second control programs may be preloaded. From the viewpoint of the effective use of limited memory resources, however, it is preferable to load some of the second control programs in accordance with priorities. Of course, the priorities may dynamically change depending on storage capacities.

When the volatile memory has a given capacity, for example, second control program A can be configured to be loaded in preference to second control program B. When the volatile memory has a different capacity, second control program B can be configured to be loaded in preference to second control program A. Various guidelines for determining priorities are available as follows. For example, a second control program having a large amount of data requires a long time for loading into the volatile memory. One possible configuration is to preload the second control program having a large amount of data. It is possible to employ various conditions of loading the second control programs as will be discussed in more detail below.

As a condition example of preferential decompression, the printing apparatus can selectively mount different storage capacities of volatile memory. The preferred decompression control program selection unit may be configured to specify a control program to be loaded in accordance with the total capacity of the volatile memory mounted on the printing apparatus. That is to say, the order of preferentially loading the control programs is determined in accordance with the capacity of the volatile memory (static volatile memory capacity) mounted on the printing apparatus. Consequently, the control programs can be loaded in a priority sequence that varies with the capacity of the mounted volatile memory and is suited for the mounted memory capacity.

This makes it possible to load the second control program in accordance with the capacity of the volatile memory mounted on the printing apparatus.

As another condition example of preferential decompression, the preferred decompression control program selection unit may be configured to specify a second control program to be loaded in accordance with an unused capacity of the volatile memory allocated after the first control program is loaded. That is to say, the volatile memory not only loads the first and second control programs, but also is capable of functioning as a buffer for various processes of the first and second control programs. The memory resource may be easily become insufficient if the second control program is loaded for all amount of the unused capacity.

A solution is to specify the order of preferentially loading the control programs in accordance with an unused capacity of the volatile memory, i.e., a dynamic volatile memory capacity. This makes it possible to reliably ensure a necessary unused capacity and accelerate processing of the control program. Various techniques can be used to determine second control programs in accordance with an unused capacity. One example is to determine second control programs to be loaded so as to always ensure an unused capacity greater than or equal to a specified limit. As another example, the unused capacity is compared with second control program sizes. When the unused capacity is large, a large second control program is loaded. When the unused capacity is small, a small second control program is loaded.

This makes it possible to reliably ensure a necessary unused capacity and accelerate processing of the control program according to the present invention.

Further, it is possible to variously specify a period for loading a second control program. As an example, the load control unit may be configured to load second control programs during a specified period in which the first control program in the printing apparatus is subject to a processing load smaller than or equal to a specified load. According to the present invention, a second control program is loaded into the volatile memory and is made to be executable before it is called. The second control program can start execution immediately when it is called.

Even before call to programs, the printing apparatus may be subject to a high processing load due to other processes. In this case, compressing and loading the control program decreases processing speeds of the other processes. As a solution, the control program is decompressed and loaded when a small processing load is applied to the printing apparatus. The printing apparatus is protected against a decrease in the processing speed by preventing an excessive load caused by the decompression and program loading.

Here, the configuration loads second control programs during a specified period in which processing in the printing apparatus is subject to a processing load smaller than or equal to a specified load. This configuration can be implemented without using a configuration that monitors a processing load and determines it with reference to a specified threshold value. For example, it is possible to configure the second control programs to be loaded during a wait period in which the printing apparatus is supplied with no print job and performs no print process; during a specified period after power is supplied to execute an IPL (Initial Program Loader) and before a print operation starts; and during a specified period in which there occurs no processor intensive process for printing a PDF (Portable Document Format) file.

This makes it possible to protect the printing apparatus against a decrease in the processing speed by preventing an excessive load caused by the decompression and program loading.

As a preferred configuration example of loading the second control programs, the load control unit has a specified intermediate storage unit. According to the configuration, the second control program is stored in a compressed form, is decompressed before the program loading, and is stored in the intermediate storage unit. When the compressed second control program is made to be executable, the processing speed decreases mainly due to decompression of the compressed data. While the second control program is decompressed and loaded during the specified period, both operations are not necessarily performed continuously. The decompression and load operations can be performed at a given time interval.

It is enough to once decompress each second control program to the intermediate storage unit after the printing apparatus starts operating. The decompression just needs to be performed in advance when the printing apparatus is subject to a small processing load. Accordingly, decompressing and storing each second control program in the intermediate storage unit eliminates the need for decompression each time the load control unit loads the second control program into the volatile memory. Just transferring the second control program to the volatile memory can make the program executable. It is possible to greatly decrease a normal processing load when second control programs are loaded. The intermediate storage unit can be configured variously and adopt HDD and RAMDISK, for example.

This makes it possible to greatly decrease a normal processing load when second control programs are loaded.

As still another preferred configuration to specify conditions of preferential decompression, the preferred decompression control program selection unit references load rule data specifying rules for loading the second control program and loads the second control program. That is to say, the load rule data specifies the rules as conditions for loading the second control program. By referencing the load rule data, the load control unit can load second control programs in accordance with the predetermined conditions.

The load rule data just needs to make correspondence between a load rule and a second control program to which the rule is to be applied. A specific file can contain data so that the rule corresponds to a second control program to which the rule is to be applied. Each second control program can have a header that contains a rule or an ID indicating the rule.

This makes it possible to easily load second control programs in accordance with the predetermined conditions.

As yet another condition example of preferential decompression, the preferred decompression control program selection unit measures a load frequency of the second control program and updates the load rule data so as to frequently load the second control program having a high load frequency. According to the configuration, a second control program having a high load frequency is preloaded frequently. As a user frequently uses the printing apparatus, it becomes conditioned to easily preload a second control program for the process the user frequently performs. The more often the process is performed, the more easily it is optimized for high-speed processing. Accordingly, the printing apparatus is customized for the user as he or she uses it. This can be implemented by using the load rule data to record the number of times the second control program has been used.

This makes it possible to fast execute a process the user frequently uses.

As still yet another condition example of preferential decompression, the load rule data may provide a rule not to allow the load control unit to load a second control program whose decompression terminates in a time shorter than or equal to a specified time. When a second control program needs a decompression time shorter than the other programs, that program does not greatly cause to decelerate processing of the printing apparatus. Such second control program is not preloaded into the volatile memory. Instead, the load rule data specifies to preload a second control program that requires a relatively long decompression time.

As a result, if a second control program is supposed to greatly decrease the processing speed, such program can be previously decompressed and loaded into the volatile memory. It is possible to effectively improve the processing speed of the printing apparatus. Of course, the present invention can adopt any of or a combination of the above-mentioned plurality of conditions for the preferential decompression. By specifying which condition to apply preferentially, the condition can most effectively improve the processing speed according to capacities, decompression times, etc. of second control programs for each printing apparatus.

This makes it possible to effectively improve the processing speed of the printing apparatus.

As another embodiment of the present invention, the nonvolatile memory and the volatile memory can interchange data via a network line. The load control unit may be configured to load a second control program received via the network line into the volatile memory. In many cases, recent printing apparatuses can be networked via LAN cables and the like. According to such configuration, the printing apparatus can not only store second control programs in its own volatile memory, but also obtain second control programs from another networked printing apparatus, computer, and the like.

According to such configuration, a huge number of second control programs can be fast executed without unnecessarily increasing printing apparatus resources. The printing apparatus can execute a wide variety of processes. It is easy to upgrade second control programs after the printing apparatus is manufactured. Of course, the network lines can include not only LAN cables, but also various interfaces such as USB and the like. The printing apparatus can be also connected via the Internet.

This makes it possible to fast execute a huge number of second control programs and allow the printing apparatus to execute a wide variety of processes. Second control programs can be easily upgraded after the printing apparatus is manufactured.

The technique of preloading a second control program before it is called is not limited to a substantial apparatus and is also effective as an invention of the method. The above-mentioned printing apparatus may be available as a standalone apparatus or may be used in connection with a computer installed with a printer driver. In this manner, the concept of the invention includes a wide variety of embodiments. The entity to load second control programs may be software or hardware for executing the software.

When an embodying example of the inventive concept is software to control the printing apparatus, the embodiment obviously exists on a medium recording such software and is used. As an example, the present invention can be specified as a medium recording the load control program that allows a computer to load the control program. Of course, the recording medium may be a magnetic recording medium or a magneto-optic recording medium. The same concept can be exactly equally applied to any recording media that will be developed in the future.

The concept is undoubtedly equally applied to a duplication stage such as primary and secondary duplicate copies. Unlike the above-mentioned media, a communication line may be used as a supply method. In such case, the communication line serves as a transmission medium for using the present invention. Of course, the present invention can be specified as an invention of a program.

Further, the present invention may be more specifically embodied as a page printer having RAM and ROM, wherein the page printer divides a control program into a main program and another module and stores them in the ROM, decompresses the main program from the ROM and loads it into the RAM for execution when the printer operates, and decompresses the module from the ROM and loads it into the RAM for execution when the main program needs the module, the page printer comprising: a storage capacity acquisition unit to obtain a storage capacity of the RAM; a preferred decompression control program selection unit to specify a module to be preferentially decompressed in accordance with the obtained storage capacity; and a load control unit to decompress the specified module and load the same into the RAM during a specified period before execution of the specified module.

DETAILED DESCRIPTION OF THE PREFERRED EMBODIMENTS

Figure 1:
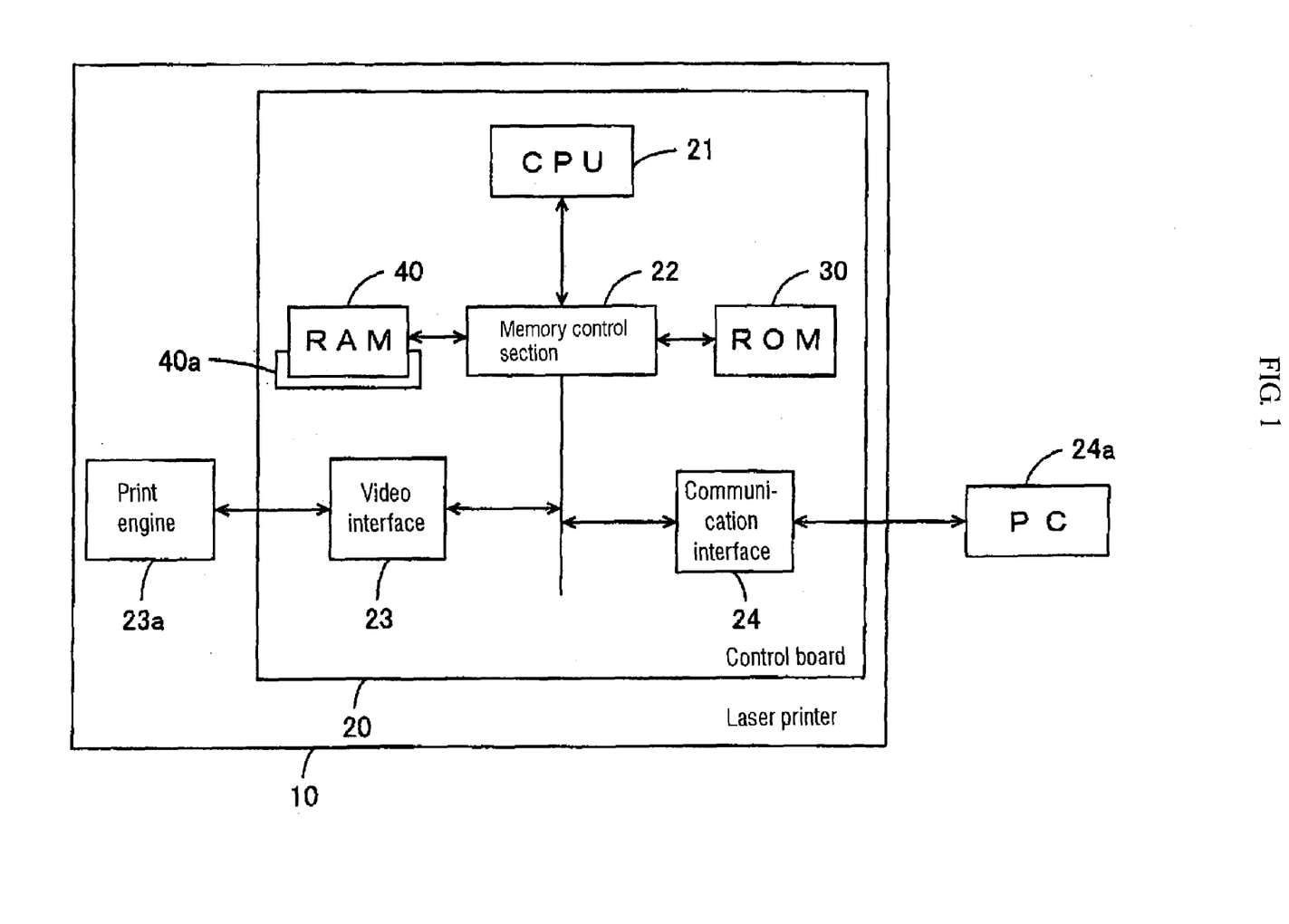
FIG. 1 is a block diagram of a laser printer.

Embodiments of the present invention will be described in the following sequence.
(1) Configuration of the laser printer
(2) Configuration of the load control program
(3) Configuration of the load rule data
(4) Processing in the load control program
(5) Other embodiments
(1) Configuration of the Laser Printer FIG. 1 is a block diagram of a laser printer 10 constituting the printing apparatus according to the present invention. The laser printer 10 comprises a control board 20 and a print engine 23a. The control board 20 is provided with main control devices associated with data processing, image processing, and the like for printing. The control board 20 is provided with a communication interface 24 and a video interface 23. The communication interface 24 is used for connection with an external personal computer (PC) 24a. The video interface 23 is provided with the print engine 23a.

During printing, the PC 24a transmits image data, print commands, and the like via the communication interface 24. Each device on the control board appropriately processes the image data and outputs the processed data from the video interface 23. The print engine 23a prints images such as characters and graphics on printout paper based on the data output from the video interface 23. The print engine 23a scans an image using a laser beam, irradiates the laser beam onto a photosensitive drum, and applies toner corresponding to an image on a dot basis onto the printout paper.

The control board 20 comprises a CPU 21, a memory control section 22, ROM 30, a memory slot 40a, the communication interface 24, and the video interface 23. The memory slot 40a has a plurality of memory receptacles and is capable of mounting the RAM 40. It is possible to change the storage capacity of the RAM 40 mounted on the control board 20 by selecting the number of RAM cards or memory modules having different storage capacities.

The memory control section 22 contains a DMAC (Direct Memory Access Controller) for fast interchanging data between the interfaces and memories. When the PC 24a receives image data and the like via the communication interface 24, for example, the memory control section 22 directly writes the image data and the like to a buffer in the RAM 40. When the CPU 21 performs image processing to generate a page of raster image in the RAM 40, the memory control section 22 transmits the raster image to the video interface 23 to output it to the print engine 23a.

Figure 2:
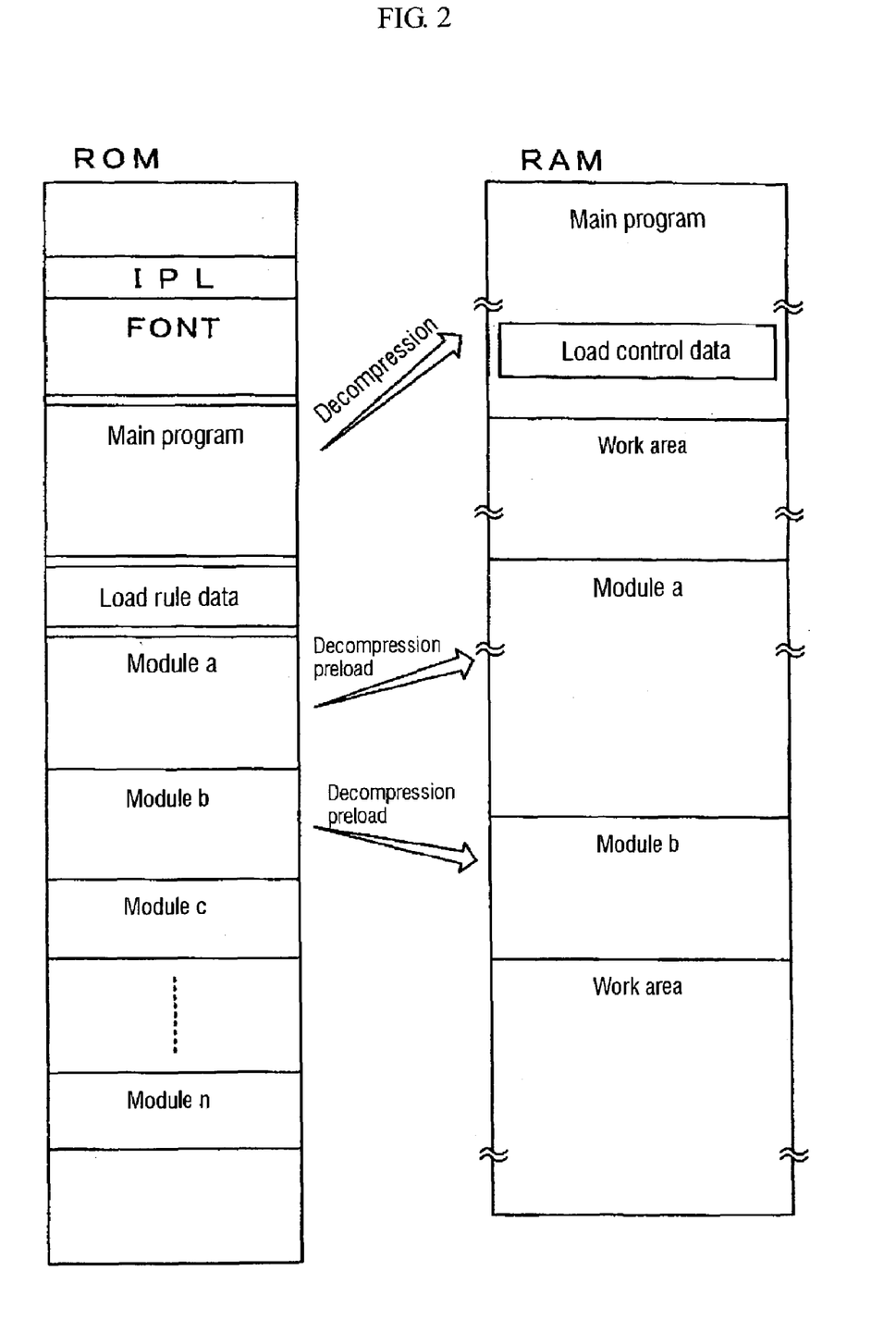
FIG. 2 exemplifies memory maps of ROM and RAM.

When the laser printer 10 is supplied with drive power, the CPU 21 initiates IPL stored in the ROM 30 for initialization. During the initialization, the CPU 21 decompresses a main program stored in the ROM 30 and transfers it to the RAM 40 to perform processing of the main program. FIG. 2 exemplifies memory maps of ROM and RAM. As shown in FIG. 2, the ROM 30 stores the IPL, font data, and the main program in a compressed form.

Since the CPU 21 cannot execute a compressed program, the main program is decompressed during the initialization and is loaded into the RAM 40 as an executable form. The main program is part of programs that can be executed on the laser printer 10. The other programs are divided into a plurality of modules (module a through module n) and are compressed and stored in the ROM 30. The main program is loaded after initialization of the laser printer 10 and resides in the RAM 40. Accordingly, the main program constitutes the above-mentioned first control program in this embodiment. Since each module is called as needed, the corresponding module constitutes the above-mentioned second control program.

These modules include various language processing programs such as ESC/Page (registered trademark of Seiko Epson Corporation), Postscript (registered trademark of Adobe Systems Incorporated), etc., image processing programs, and the like. Though the modules are not always needed while the laser printer 10 is active, they are needed for specific processing or printing of specific image data, and are dynamically loaded as needed. According to the embodiment, a load control program, part of the main program, controls the module load timing. The load control program decompresses a specific module and loads it into the RAM 40 before call to that module. Accordingly, the module can immediately start executing without being decompressed.

(2) Configuration of the Load Control Program

Figure 3:
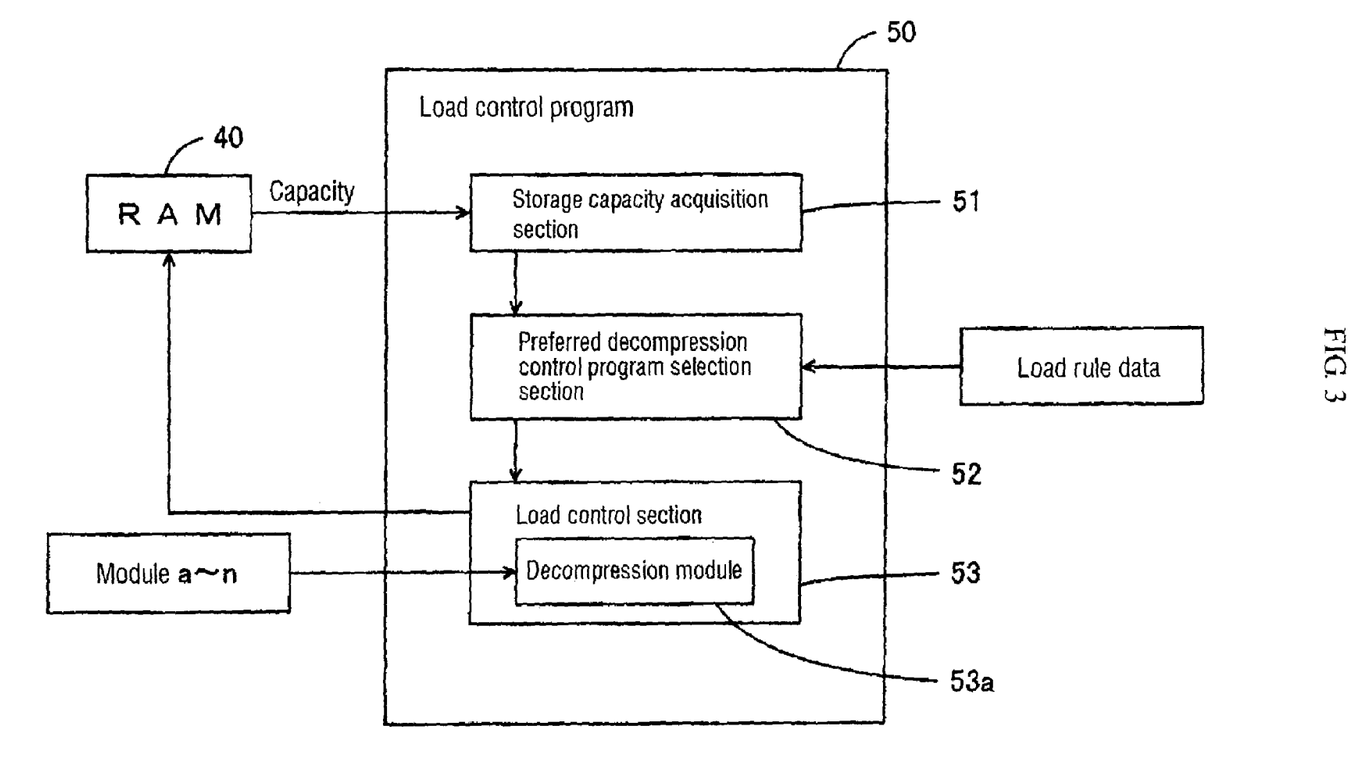
FIG. 3 is a block diagram showing a functional configuration of a load control program.

FIG. 3 is a block diagram showing a functional configuration of the load control program. As part of the main program processing, a load control program 50 is executed within a specified period in which the main program causes a low processing load. The load control program 50 decompresses and loads the module into the RAM 40. Consequently, the load control program 50 comprises, as functions, a storage capacity acquisition section 51, a preferred decompression control program selection section 52, and a load control section 53. The storage capacity acquisition section 51 accesses the RAM 40, checks for its capacity, and obtains the total capacity of the RAM 40 mounted on the control board 20.

The preferred decompression control program selection section 52 references the total capacity of the RAM 40 and load rule data stored in the ROM 30 and selects a module to be loaded. The module to be selected should be loaded into the RAM 40 before called from the main program. The load control section 53 has a decompression module 53a, obtains the selected module from the ROM 30, decompresses the module, and loads it into the RAM 40.

As shown in FIG. 2, the ROM 30 stores not only the IPL and the load rule data, but also the main program and the modules a through n. The main program and the modules a through n are compressed and stored in the ROM 30 for the effective use of resources. The decompression module 53a reads and decompresses the modules a through n. The decompressed modules increase their capacities and become executable so that the CPU 21 can interpret the associated commands.

The load control section 53 loads the decompressed and executable modules into the RAM 40. Since the load control program 50 is executed within the specified period according to the embodiment, modules are loaded into the RAM 40 before it is called from the main program. Of course, all the modules need not be preloaded. Modules to be preloaded are predetermined according to the load rule data which will be discussed in more detail below.

(3) Configuration of the Load Rule Data

Figure 4:
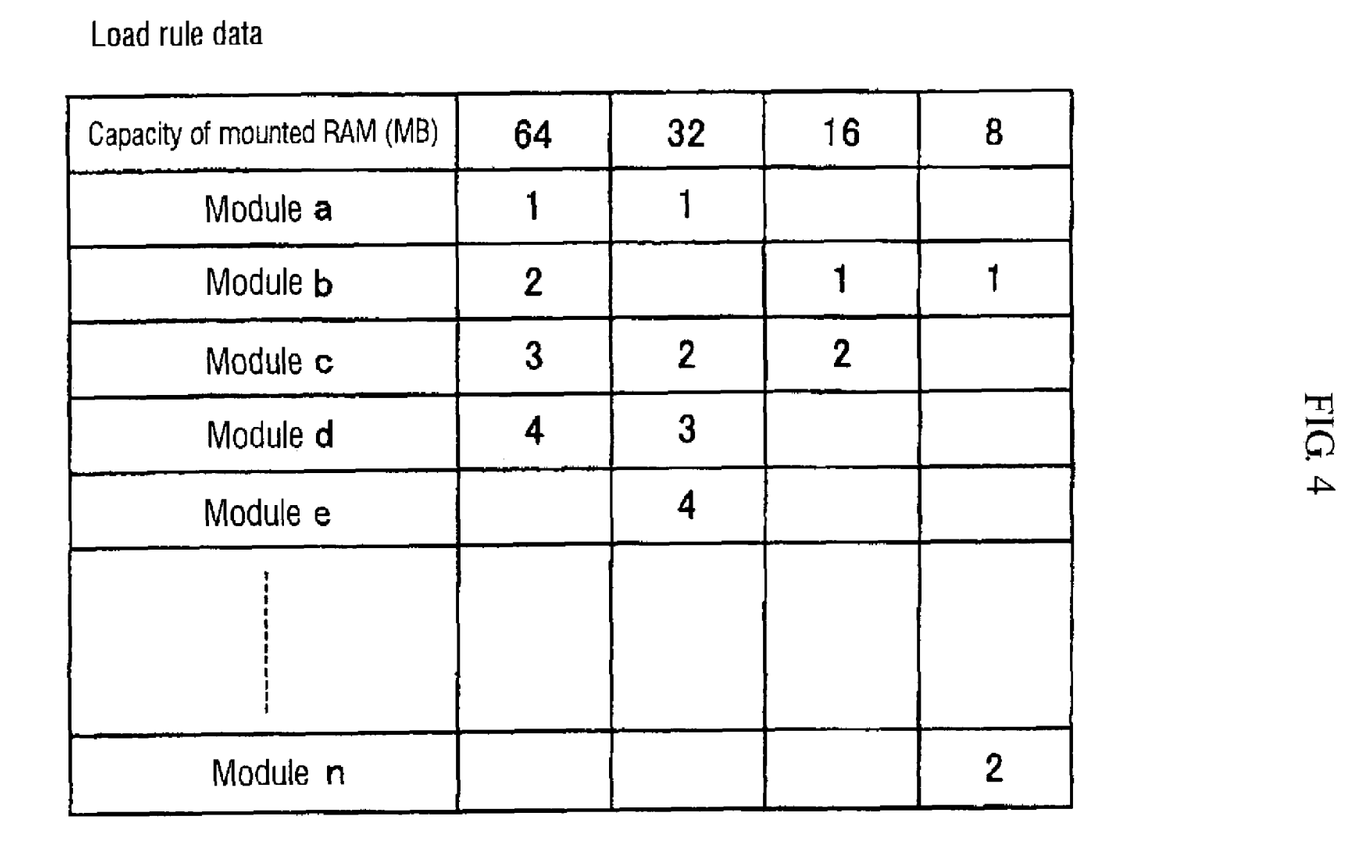
FIG. 4 exemplifies contents of load rule data.

The load rule data specifies modules that should be loaded preferentially. The embodiment determines these modules based on the total capacity of the RAM 40. FIG. 4 exemplifies contents of the load rule data. FIG. 4 shows the modules a through n in the descending order of capacities from the top. This indicates priorities of the modules to be decompressed and loaded with reference to the total capacity of the RAM 40. According to the embodiment, the module priorities depend on the total capacity of the RAM 40 mounted on the control board 20.

More specifically, when the control board 20 is mounted with the RAM 40 having the total capacity of 64 MB, the modules a, b, c, and d are preferentially loaded in this sequence. That is to say, all the modules a through d are preloaded when the RAM 40 reserves an unused memory capacity large enough for a work area. When the unused memory capacity for the work area decreases in some degree and all the modules a through d cannot be preloaded, the modules a through c are loaded in order, and module d is not loaded.

The modules are loaded according to the priorities in this manner. Of course, it is possible to preload the modules in a sequence that contradicts the priority sequence by ensuring an unused memory capacity sufficient for the work area so that the main program can perform image processing and the like. For example, there may be a case where the unused memory capacity for the work area is too small to load the module a entirely but is capable of loading module b or c. In such a case, it is possible to load any of the modules b through d or a combination thereof.

The same applies to the total capacity of 32 MB, 16 MB, 8 MB, and the like for the RAM 40 mounted on the control board 20. When the modules are loaded according to the priority sequence based on the work area capacity, a module with the highest priority may not be loaded. In such a case, it is possible to load modules with priorities lower than the highest priority. In any case, a constantly needed work area does not largely change under control of the laser printer 10. It is possible to estimate the work area capacity based on the total capacity of the RAM 40 mounted on the control board 20.

Accordingly, it is possible to predetermine an optimal sequence of loading modules a through n as load rule data according to the capacity of the mounted RAM 40. The modules can be preloaded in a sequence appropriate for the mounted memory capacity just by referencing the load rule data in the preferred decompression control program selection section 52. Of course, the load rule data in FIG. 4 is merely an example, and the present invention is not limited thereto. Various priority sequences are available. The priority sequences can be determined for more RAM capacities to be mounted. According to the embodiment, the load rule data is continuously stored in the ROM 30 as shown in FIG. 2. Further, various configurations are applicable in such a manner that each module's header contains data for maintaining correspondence between the mounted RAM capacity and the priority sequence.

(4) Processing in the Load Control Program

Figure 5:
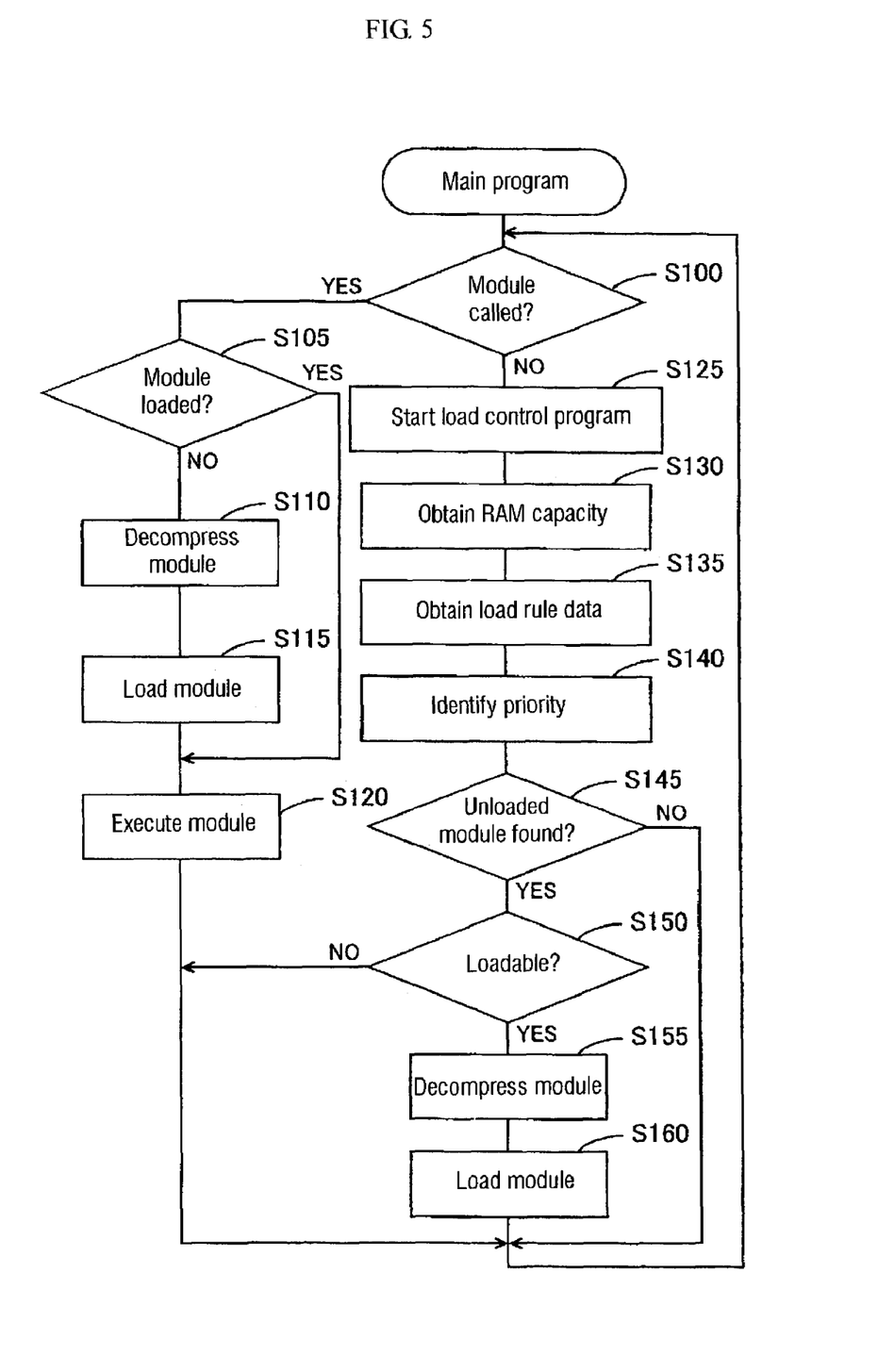
FIG. 5 is a flowchart showing main program processing.

Referring now to FIG. 5, the following describes a process flow of the main program executed during operations of the laser printer 10. The description will focus on processing in the load control program. When loaded into the RAM 40, the main program starts execution. When the executing main program receives a print command from the PC 24a or accepts an operation from an operation panel (not shown) of the laser printer 10, the main program appropriately calls modules needed for executing the print command and the like to perform related processes.

When performing a given process, the main program determines which module to call (step S100). If it is determined that the module is called at step S100, the main program determines whether or not the called module is already loaded into the RAM 40 (step S105). If it is not determined at step S105 that the module is loaded, the main program decompresses the module stored in the ROM 30 (step S110) and loads it into the RAM 40 (step S115). The main program then executes the loaded module (step S120) and continues the main program process at step S100 and later.

If it is determined that the module is already loaded at step S105, the main program executes the module loaded in the RAM 40 (step S120). When the module to be called is already loaded in the RAM 40, the module can be immediately executed without passing through steps S110 and S115 for fast processing. As mentioned above, the present invention contributes to acceleration of the main program processing even if all the modules are not preloaded in the RAM 40. The preload largely advantages acceleration of the processing speed especially when a module takes a long time for decompression or a large-capacity module takes a long time to be loaded into the RAM 40. Obviously, when the large-capacity RAM 40 is mounted on the control board 20 and provides a sufficient unused memory capacity, preloading all the modules can greatly accelerate the processing speed of the main program.

If it is determined that no module is called at step S100, there is no need for module processing. The main program enters a wait state in which a small processing load is imposed on the main program. According to the present invention, the load control program 50 preloads modules during this wait period. The load control program 50 is activated at step S125. When the load control program 50 is activated, the storage capacity acquisition section 51 obtains the total capacity of the RAM 40 mounted on the control board 20 (step S130).

Then, the preferred decompression control program selection section 52 obtains the load rule data (step S135). The preferred decompression control program selection section 52 references the total capacity of the RAM 40 obtained at step S130 and identifies the priorities of modules a through n to be loaded (step S140). After the module priorities are obtained, the load control section 53 checks if a module assigned with the priority is already loaded in the RAM 40 (step S145). If it is not determined at step S145 that an unloaded module exists, the main program continues the process at step S100 without preloading the modules. If it is determined at step S145 that an unloaded module exists, the main program determines whether or not the unloaded module can be loaded on the basis of an unused memory capacity for the work area in the RAM 40, i.e., whether or not a sufficient unused capacity can be allocated for the work area after loading the module (step S150). The main program performs the process at step S155 and later for the module that is determined to be loadable.

If it is not determined at step S150 that a loadable module is available, the main program continues the process at step S100 and later without preloading the modules. If it is determined at step S150 that a loadable module is available, the decompression module 53a decompresses the module stored in the ROM 30 (step S155) and loads it into the RAM 40 (step S160). Immediately after the initialization, there is no preloaded module. None of the modules specified in the load rule data is loaded into the RAM 40. The main program checks if all modules are loadable.

Modules are preloaded after the load control program 50 is initiated at least once. The main program process may delete some of the preloaded modules in order to ensure the work area. When a deleted module exists, it can be preloaded again according to the process at step S125 and later. Modules to be preloaded may somewhat depend on print operations of the laser printer 10. However, the process according to the present invention always preloads the modules appropriate for the total capacity of the mounted RAM and an unused memory capacity for the work area. The preloaded module can be executed immediately when it is called without decompression and loading. This speeds up processes in the main program.

(5) Other Embodiments

Figure 6:
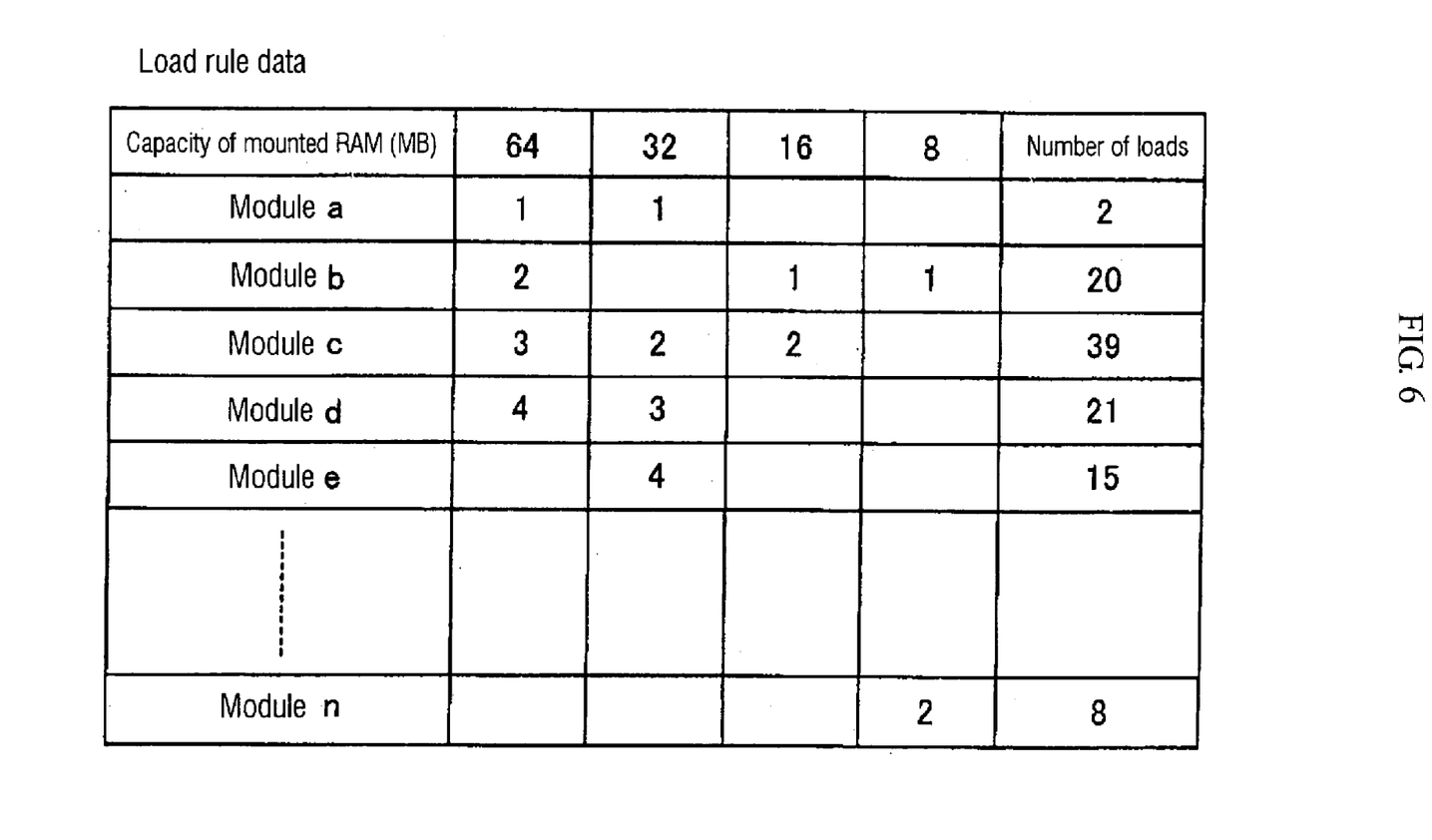
FIG. 6 exemplifies contents of load rule data according to another embodiment
Figure 7:
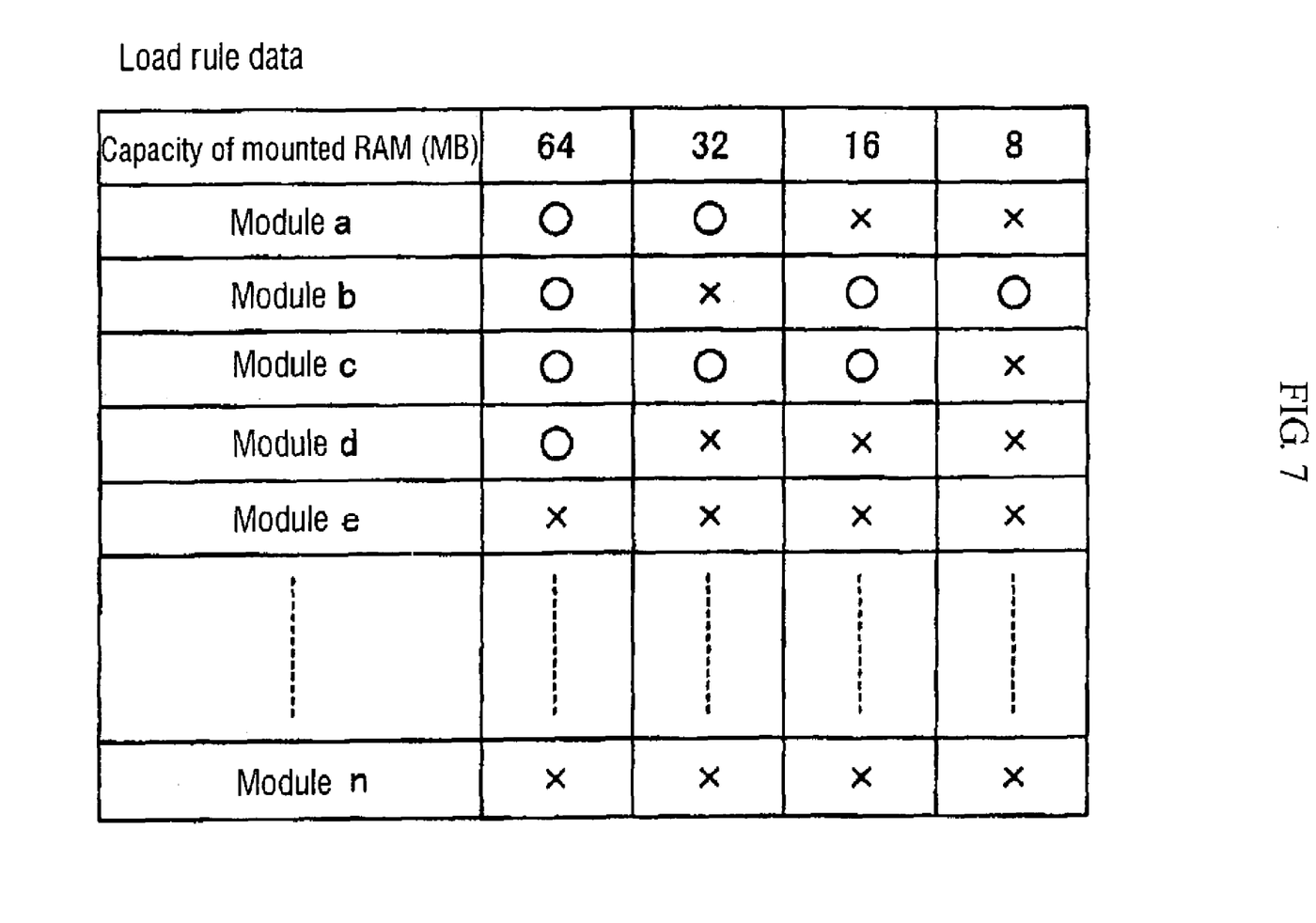
FIG. 7 exemplifies contents of load rule data according to still another embodiment FIG. 8 exemplifies contents of load rule data according to yet another embodiment
Figure 8:
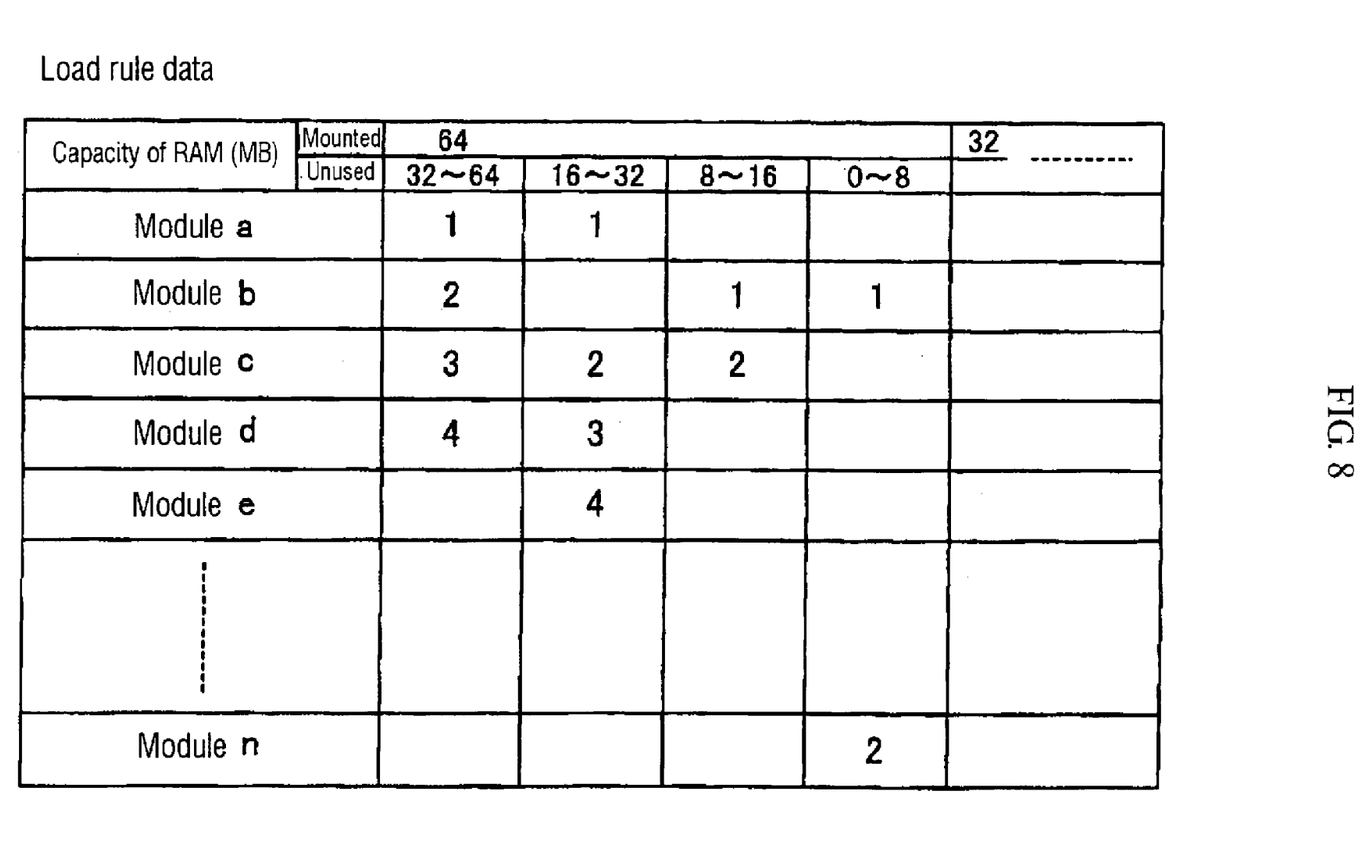

The above-mentioned embodiment specifies the priority sequence in the load rule data according to the capacity of the RAM 40 mounted on the control board 20. The embodiment determines a module to be preloaded into the RAM 40 based on the load rule data. In addition to this configuration, the load rule data can be determined on the basis of various conditions. FIGS. 6 through 8 exemplify contents of the load rule data according to the other embodiments.

The load rule data in FIG. 6 specifies the load count for each module in addition to the priority sequence for the total capacity of the RAM 40 in FIG. 4. A module preloaded into the RAM 40 is determined by the total capacity of the RAM 40 mounted on the control board 20 and the load frequency of the modules. There is a variety of specific techniques for determining modules according to the load frequency. For example, a highly prioritized module can be loaded with a reversed priority if that module is loaded many times.

For example, when a module with the priority n+1 has been loaded twice or more as many times as a module with the priority n, the module with the priority n+1 is loaded in preference to the module with the priority n. When a module with the priority n+2 has been loaded three times or more as many times as a module with the priority n, the module with the priority n+2 is loaded in preference to the module with the priority n. Further, the other configurations can be used.

FIG. 6 shows the load counts of "2", "20", and "39" for the modules a, b, and c, respectively when the mounted RAM 40 has the capacity of 64 MB. The load count for the module b is more than twice as large as that for the module a. The load count for the module c is more than three times as large as that for the module a. Therefore, the modules b and c are loaded in preference to the module a.

Of course, this configuration is just an example. As another configuration, the priority sequence of modules can be reversed when the load count exceeds a specified limit. Alternatively, it is also possible to preferentially load modules (e.g., modules e through n for the RAM 40 with the capacity of 64 MB) other than those assigned with the priorities as shown in FIG. 4. It becomes possible to preload modules that are frequently loaded in a normal usage mode of the laser printer 10 by changing preload priorities in consideration for the load frequency of each module. This makes it possible to provide customization in accordance with usage modes of the laser printer 10.

The load rule data in FIG. 7 specifies the load modules based on the capacity of the mounted RAM 40. In addition, the load rule data specifies not to preload a module whose decompression time is short. A module to be loaded is marked with a circle. Since the modules a through n in FIG. 7 are arranged in the descending order of capacities, the top module is given the highest priority. Even if the modules are defined to be preloaded according to the priority sequence in FIG. 4, the load rule data in FIG. 7 specifies not to preload any of those modules whose decompression time is short.

When the mounted RAM 40 has the capacity of 32 MB, for example, modules d and e are specified to be preloaded according to the third and fourth priorities in FIG. 4. In FIG. 7, however, these modules d and e are specified not to be preloaded. In this manner, a module having a short decompressing time is specified not to be preloaded. A module having a long decompressing time is loaded preferentially. This makes it possible to effectively use resources and eliminate major factors of decreasing the processing speed of the main program.

The load rule data in FIG. 8 specifies priorities in accordance with the total capacities and unused capacities of the RAM 40 in FIG. 4. That is to say, priorities are dynamically specified in accordance with the unused capacities, not specified uniformly in accordance with the total capacity of the RAM 40 mounted on the control board 20. Let us consider that the 64-MB RAM 40 is mounted on the control board 20. When the RAM 40 has the unused capacity of 32 to 64 MB, the modules are loaded in the order of a, b, c, and d. When the RAM 40 has the unused capacity of 16 to 32 MB, the modules are loaded in the order of a, c, d, and e. By changing priorities for each unused capacity, just referencing the load rule data can load modules in accordance with unused capacities of the RAM 40.

Figure 9:
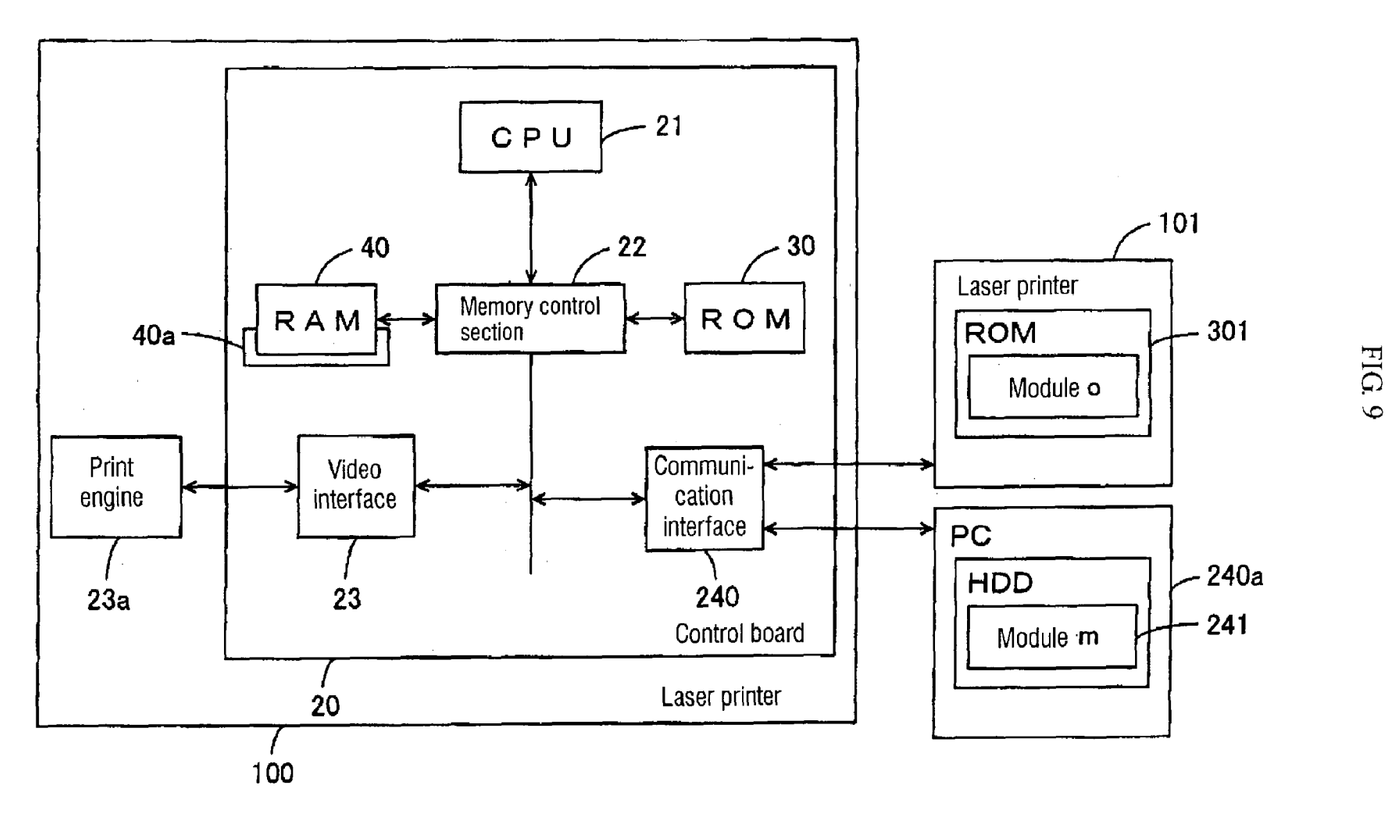
FIG. 9 shows a configuration example of the printer according to another embodiment.
Figure 10:
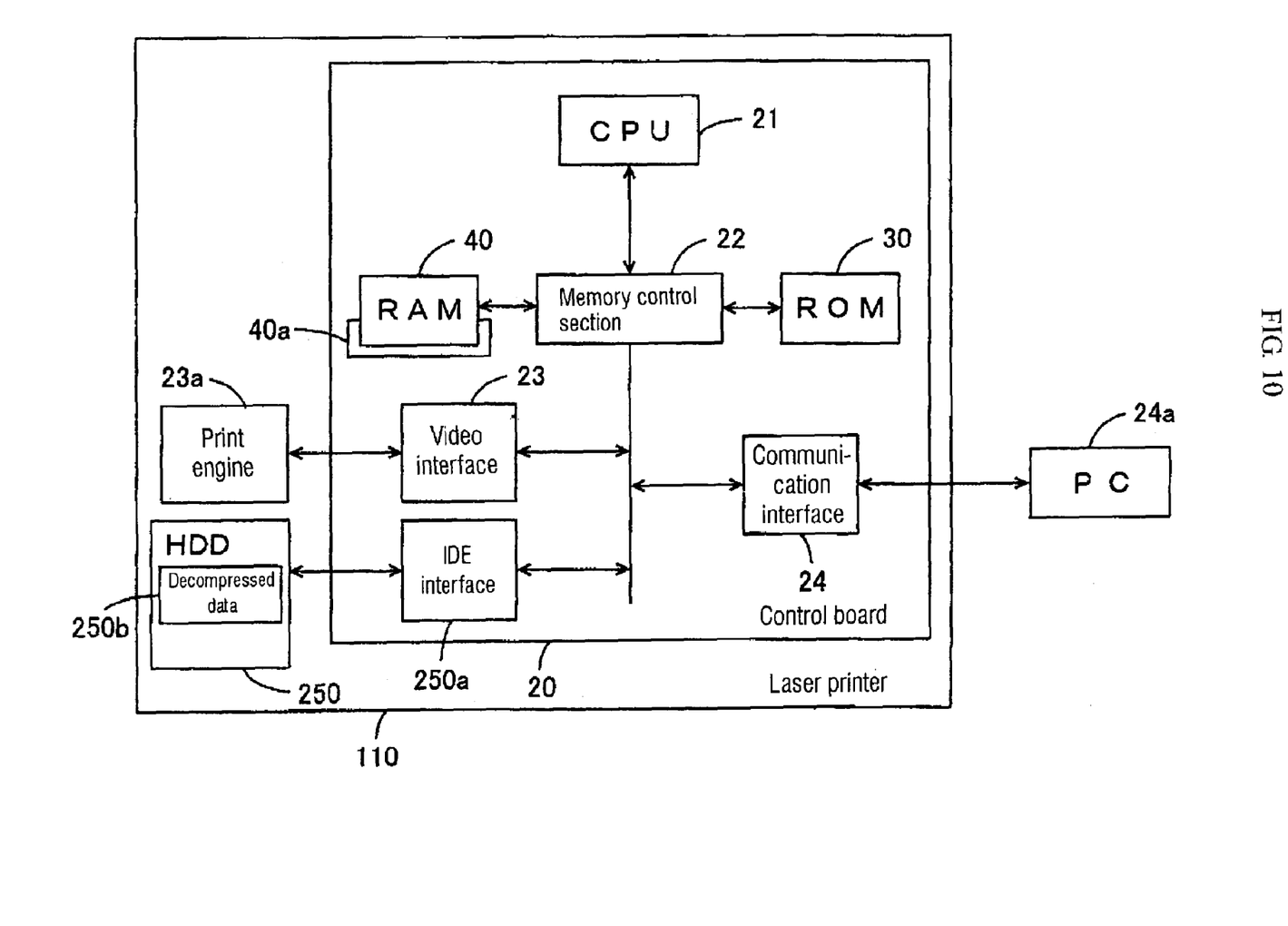
FIG. 10 shows a configuration example of the printer according to still another embodiment.

As mentioned above, the present invention can configure various embodiments by changing the load rule data. Of course, it is also possible to combine the technical concepts represented in FIGS. 6 through 8. Moreover, various embodiments can be configured in addition to changing the load rule data. For example, the present invention is not limited to the hardware configuration and the data storage location of the laser printer 10 as shown in FIG. 1. FIGS. 9 and 10 show configuration examples of the printing apparatus according to the other embodiments. With reference to FIGS. 9 and 10, in which parts similar to those previously described with reference to FIG. 1 are denoted by the same reference numerals.

FIG. 9 is a block diagram of a laser printer 100 constituting the printing apparatus according to another embodiment. The laser printer 100 has almost the same configuration as the laser printer 10 in FIG. 1 but differs in a communication interface 240 provided on the control board 20. As shown in FIG. 9, the communication interface 240 connects with a laser printer 101 and a PC 240a. That is to say, the laser printer 101 is connected to various external devices via the communication interface 240 and is capable of bidirectional communication with each other.

Like the PC 24a, the PC 240a can send image data, print commands, etc. to the laser printer 100 and contains a hard disk drive (HDD) 241 that stores a module m used for the laser printer 100. The laser printer 101 has almost the same hardware as the laser printer 100 and contains ROM 301 that stores a module o used for the laser printers 100 and 101.

The ROM 30 of the laser printer 100 stores the main program. The main program can call not only modules a through n stored in the ROM of the laser printer 100 itself, but also modules m and o stored in the PC 240a and the laser printer 101. The main program can load these modules into the RAM 40. Of course, it is also possible to use the load rule data according to the present invention to provide the modules m and o with preload priorities and load these modules into the RAM 40 before calling them.

Accordingly, the laser printer 100 can execute modules other than those stored in the ROM 30 and omit the compression time and the load time for executing the modules, accelerating the processing speed of the main program. After shipment of the laser printer 100 whose ROM 30 stores specified modules, the embodiment can store the other modules in storage areas of the PC 240a, the laser printer 101, and the like, allowing the use of modules that are not stored in the ROM 30 at the shipment. Consequently, it become possible to easily upgrade modules or add new functions.

FIG. 10 is a block diagram of a laser printer 110 constituting the printing apparatus according to still another embodiment. The laser printer 110 has almost the same configuration of the laser printer 10 in FIG. 10 and further contains a hard disk drive (HDD). The control board 20 has an IDE interface 250a. An HDD 250 is connected to a bus via the IDE interface 250a. Consequently, the CPU 21 can access the HDD 250 via the memory control section 22 to write and read data from the HDD 250.

According to the embodiment, the main program stored in the ROM 30 is decompressed during IPL and is loaded into the RAM 40. The other modules are decompressed during a specified period in which a low processing load is imposed on the laser printer 110. The decompressed modules are stored as decompressed data 250b in the HDD 250. Therefore, the modules need not be decompressed one by one when each module is preloaded or called. Only transferring data from the HDD 250 to the RAM 40 completes loading of the modules into the RAM 40, enabling the modules to be executable. As a result, it is possible to decrease a processing load when a preload is executed.

As mentioned above, the printing apparatus according to the present invention is mounted with volatile memory that provides a main storage area. The printing apparatus specifies a second control program to be preferentially decompressed on the basis of the volatile memory's storage capacity. The specified second control program is decompressed before execution and is loaded into the volatile memory. Therefore, no decompression is needed during execution of the second control program, increasing processing speeds of the first and second control programs.

What is claimed is:

1. A printing apparatus having volatile memory to provide a main storage area and nonvolatile memory to store a first control program to be used constantly and a second control program to be used as needed, wherein both control programs are compressed; and, when the second control program becomes necessary in accordance with execution of the first control program, the printing apparatus dynamically decompresses the second control program stored in the nonvolatile memory into the volatile memory and executes the decompressed second control program, the printing apparatus comprising:
   a storage capacity acquisition unit to obtain a storage capacity of the volatile memory;
   a preferred decompression control program selection unit to specify the second control program to be preferentially decompressed in accordance with the obtained storage capacity; and
   a load control unit to decompress the specified second control program and load the same into the volatile memory during a specified period before execution of the specified second control program.

2. The printing apparatus according to claim 1, wherein the preferred decompression control program selection unit specifies a second control program in accordance with an unused capacity of the volatile memory to be ensured after the first control program is loaded.

3. The printing apparatus according to claim 1, wherein the load control unit loads the second control program during a specified period in which the first control program in the printing apparatus is subject to a processing load smaller than or equal to a specified load.

4. The printing apparatus according to claim 1, wherein the load control unit has a specified intermediate storage unit, decompresses the compressed and stored second control program before execution of the load, and stores the decompressed second control program in the intermediate storage unit.

5. The printing apparatus according to claim 1, wherein the preferred decompression control program selection unit references load rule data specifying rules for loading the second control program to load the second control program.

6. The printing apparatus according to claim 5, wherein the preferred decompression control program selection unit measures a load frequency of the second control program and updates the load rule data so as to frequently load the second control program having a high load frequency.

7. The printing apparatus according to claim 5 or 6, wherein the load rule data provides a rule not to allow the load control unit to load a second control program whose decompression terminates in a time shorter than or equal to a specified time.

8. The printing apparatus according to claim 1, wherein the nonvolatile memory and the volatile memory can interchange data via a network line; and the load control unit loads a second control program received via the network line into the volatile memory.

9. A control program loading method for a printing apparatus having volatile memory to provide a main storage area and nonvolatile memory to store a first control program to be used constantly and a second control program to be used as needed, wherein both control programs are compressed; and, when the second control program becomes necessary in accordance with execution of the first control program, the printing apparatus dynamically decompresses the second control program stored in the nonvolatile memory into the volatile memory and executes the decompressed second control program, the method comprising:
- a storage capacity acquisition step for obtaining a storage capacity of the volatile memory;
- a preferred decompression control program selection step for specifying the second control program to be preferentially decompressed in accordance with the obtained storage capacity; and
- a load control step for decompressing the specified second control program and load the same into the volatile memory during a specified period before execution of the specified second control program.

10. A computer readable medium recording a load control program to load a control program on a printing apparatus having volatile memory to provide a main storage area and nonvolatile memory to store a first control program to be used constantly and a second control program to be used as needed, wherein both control programs are compressed; and, when the second control program becomes necessary in accordance with execution of the first control program, the printing apparatus dynamically decompresses the second control program stored in the nonvolatile memory into the volatile memory and executes the decompressed second control program, wherein the load control program provides a computer with:
- a storage capacity acquisition function to obtain a storage capacity of the volatile memory;
- a preferred decompression control program selection function to specify the second control program to be preferentially decompressed in accordance with the obtained storage capacity; and
- a load control function to decompress the specified second control program and load the same into the volatile memory during a specified period before execution of the specified second control program.

11. A page printer having RAM and ROM, wherein the page printer divides a control program into a main program and another module and stores them in the ROM, decompresses the main program from the ROM and loads it into the RAM for execution when the printer operates, and decompresses the module from the ROM and loads it into the RAM for execution when the main program needs the module, the page printer comprising:
- a storage capacity acquisition unit to obtain a storage capacity of the RAM;
- a preferred decompression control program selection unit to specify a module to be preferentially decompressed in accordance with the obtained storage capacity; and
- a load control unit to decompress the specified module and load the same into the RAM during a specified period before execution of the specified module.

* * * * *